United States Patent [19]

Richmond et al.

[11] Patent Number: 4,693,902

[45] Date of Patent: Sep. 15, 1987

[54] PASTEURIZATION PROCESS

[75] Inventors: Donald W. Richmond; Carl W. Clyne; Tod M. Holben, all of St. Louis County, Mo.

[73] Assignee: Anheuser-Busch, Incorporated, St. Louis, Mo.

[21] Appl. No.: 737,871

[22] Filed: May 28, 1985

Related U.S. Application Data

[63] Continuation-in-part of Ser. No. 620,471, Jun. 14, 1984, abandoned.

[51] Int. Cl.$^4$ .......................... A23L 3/02; C12H 1/00
[52] U.S. Cl. ................................. 426/407; 426/232; 426/521; 99/275; 99/483
[58] Field of Search ............... 426/407, 521, 325, 401, 426/412, 232, 11, 13, 16; 99/275, 483, 362, 361; 422/25, 304

[56] References Cited

U.S. PATENT DOCUMENTS

| | | | |
|---|---|---|---|
| 4,263,254 | 4/1981 | Huling | 99/362 |
| 4,279,858 | 7/1981 | Huling | 99/362 |
| 4,331,629 | 5/1982 | Huling | 99/362 |
| 4,441,406 | 4/1984 | Becker et al. | 426/521 |

*Primary Examiner*—Raymond N. Jones
*Assistant Examiner*—Marianne M. Cintins
*Attorney, Agent, or Firm*—Gravely, Lieder & Woodruff

[57] ABSTRACT

A precision tunnel pasteurization process in which the spray density is at least 6 gal./min./ft.$^2$ of processing area and the spray is uniformly distributed over the processing area of the pasteurizer is disclosed, whereby the spray water heats the beer to 140° F.–143° F. and then cools the beer to 70° F.–85° F. The spray nozzles are positioned on staggered centers having 9–12" longitudinal spacing and 6" transverse spacing with 3" spacing from side walls and the nozzle bore is $\frac{3}{8}$". The nozzle pressure is about 5 psig to 6 psig and the spray nozzles are the type which are the least likely to become clogged.

16 Claims, 7 Drawing Figures

PASTEURIZATION PROCESS

Reference to Prior Application

This application is related to, contains subject matter in common with, and is a continuation-in-part of Ser. No. 620,471, filed June 14, 1984, now abandoned entitled PASTEURIZATION PROCESS AND APPARATUS.

BACKGROUND OF THE INVENTION

Pasteurization has been used in the wine and brewing industry for many years having been developed around 1865 by Louis Pasteur. Pasteurization is the reduction of microorganisms by heating to a limited temperature and holding at that temperature such that there will be minimum effect on physical stability and flavor and a maximum extension of biological stability, thereby increasing shelf life.

Although the present application describes the invention with reference to the pasteurization of beer, the invention also is applicable to all products which are pasteurized in a package, including soda and other soft drinks, fruit juices and drinks, and milk. The specific P.U. inputs and temperatures and time will vary according to the product being treated.

The various organisms in beer are not pathological and dangerous to humans, but affect the taste and appearance of the beer if allowed to grow. Draft beer generally is not pasteurized because it is kept refrigerated and is usually consumed in a short time. However, high quality can and bottle beer traditionally is pasteurized for long shelf life, and conventional type pastuerizers are shown in Herold U.S. Pat. No. 2,282,187 issued May 5, 1942 and Wehmiller U.S. Pat. No. 2,658,608 dated Nov. 10, 1953.

In this type pasteurizer, water is sprayed onto the tops of the closely packed packages which are moved through a tunnel which is divided into a series of preheat zones, a series of heating zones, a holding zone, and a series of cooling zones. The temperature of the beer in the containers is progressively raised to the desired level before being passed through the cooling zones where it reaches the desired beer out temperature (BOT). The water running off the packages is collected in reservoirs, heated or cooled, and recycled to the sprays of spray pans. These types of tunnel pasteurizers are available in single and double deck configurations. The spray nozzles on the lower decks traditionally are difficult to maintain free from blockage, so the single deck conveyor has been the generally accepted norm in the brewing industry in the United States.

If pasteurization causes the temperature of the beer to reach too high a level, certain tastes called "pasteurization tastes" can occur in the beer. These are undesirable and have been defined as "bready", "biscuity", "burnt-type tastes", "papery" or "cardboardy". Also, insufficient pasteurization can result in turbidity of the beer or sedimentation.

The organisms which cause the most difficulty in the brewing industry today are lactobacillus, pedioococcus and wild yeast. These are not pathogenic organisms but can cause turbidity and poor taste in beer. In order to insure complete pasteurization of beer, the temperature of the beer at the so-called "cold spot" which is ¼" from the bottom of the center of the can or bottle must reach at least 140° F. for a period of time to produce a specified number of pastuerization units (P.U.). It also is desired to pasteurize at the lowest possible peak cold spot temperature (above 140° F.) to avoid overheating the rest of the package contents, because the temperature of the package gets higher as one goes from the cold spot to the top of the package.

The P.U. is a measure of accumulated lethality. One P.U. for beer is one minute at 140° F. Lethality (P.U. per minute) is a rate term which is exponential with temperature. Lethality begins to become significant only when the beer temperature is 132° F. to 135° F. and is most significant at 139° F. and above, although P. U. accumulation begins at 120° F.

Over the years different minimum P.U. have been stated as the requirement for pasteurizing beer, but it is clear that at least 5.6 P.U. are required and if numerous organisms are present, a standard of 8 P.U. has been set forth. Some breweries require a minimum of 10 P.U. as their standard. It has been determined that *Lactobacillus Brevis* is the most heat resistant bacteria normally occurring in beer. It is this organism that brewery pasteurization of beer requires 140° F. as the minimum standard temperature for pasteurization.

Conventionally, some pasteurizers have used spray densities as low as 3.4 gal./min./ft.$^2$ of tunnel surface area and have used spray heads aligned in a straight line running the length of the tunnel. Recent precise measurements of the spray pattern developed in such pasteurizers have shown a wide variance of water applied to the different cans or bottles across the width of the tunnel. Thus, the product will receive varying and insufficient water spray coverage, resulting in non-uniform heating (or cooling) of the product. This in turn results in non-uniform product pasteurization. It is desired to maintain a uniform P.U. input to the packages, i.e., a standard deviation of P.U. input of two or less.

As used in the brewing industry in reference to P.U. input, the term, standard deviation, means that the P.U. input to all packages varies by only the stated amount. Thus a standard deviation of P.U. input of two or less indicates that the P.U. input to any package in the line varies by only ±2 P.U. at the most. This is not the same meaning the term standard deviation has when used in the fields of statistics, probability, etc.

The theory of transfer of heat from the water spray to the contents of the container is that the film resistance to transfer is greatest at the inside wall of the container and mixing in the container occurs through thermal conduction and convection currents generated as the contents are heated and circulated. The circulatory motion across the heat transfer surfaces reduces the internal surface film resistance and tends to bring the container contents to an equilibrium temperature. The so-called "coldspot" in the container is stated to be ¼" above the center of the bottom wall and is the last point to come to equilibrium temperature through these conduction and convection currents. It is necessary to raise the temperature of the cold spot to above 140° F., but is desirable to hold it as close to 140° F. as possible to minimize taste changes caused by excess heating of the remainder of the container.

Accordingly, it is a principle object of the present invention to provide a pasteurization process in which there is very little deviation in P.U. applied to each package. It is a further object to maximize heat transfer efficiency by applying a uniform amount of water to each package and to provide increased intensity of water flow over the product. It is still another object to provide the lowest practical beer out temperature for the product leaving the pasteurizer.

It is still another object of the present invention to provide an improved double deck pasteurizer in which only a single set of upper deck spray heads is required with the overflow from the upper deck dripping onto the containers on the lower deck in a volume and at a temperature such that the P.U. input between the two decks is substantially the same.

Still a further object is to provide a tunnel pasteurizer in which the pattern of spray heads is staggered across the surface area of the tunnel such that the flow of heating and cooling water is uniform onto the containers on the deck. It is still another object to provide a pasteurizer tunnel such that the flow through the spray heads is at least 7 gal./min./ft.$^2$ of tunnel surface area. A further object is to provide a pasteurizer process such that the first cooling zone is regenerative with the first heating zone, i.e., the zone where spray temperature is first at 140° F., to more rapidly heat the product toward 140° F. and allow a longer holding period at a lower product cold spot temperature as close to, but greater than 140° F. as possible, thereby reducing the maximum hot spot temperature while maintaining the P.U. input to the contents of the container.

These and other objects and advantages will become apparent hereinafter.

SUMMARY OF THE INVENTION

The present invention comprises a pasteurizer process which produces precision pasteurization of all filled packages with little variation in P.U. input to each package and produces a maximum cold spot temperature as close as possible to, but greater than, 140° F. and the lowest consistant practical beer out temperature. The invention comprises a tunnel pasteurizer in which the spray heads are staggered transversely and produce an intense and uniform water spray pattern of at least 7 gal./min./ft.$^2$ of tunnel surface area.

DESCRIPTION OF THE DRAWINGS

In the drawings wherein like numerals refer to like parts wherever they occur.

DETAILED DESCRIPTION

Figure 1:
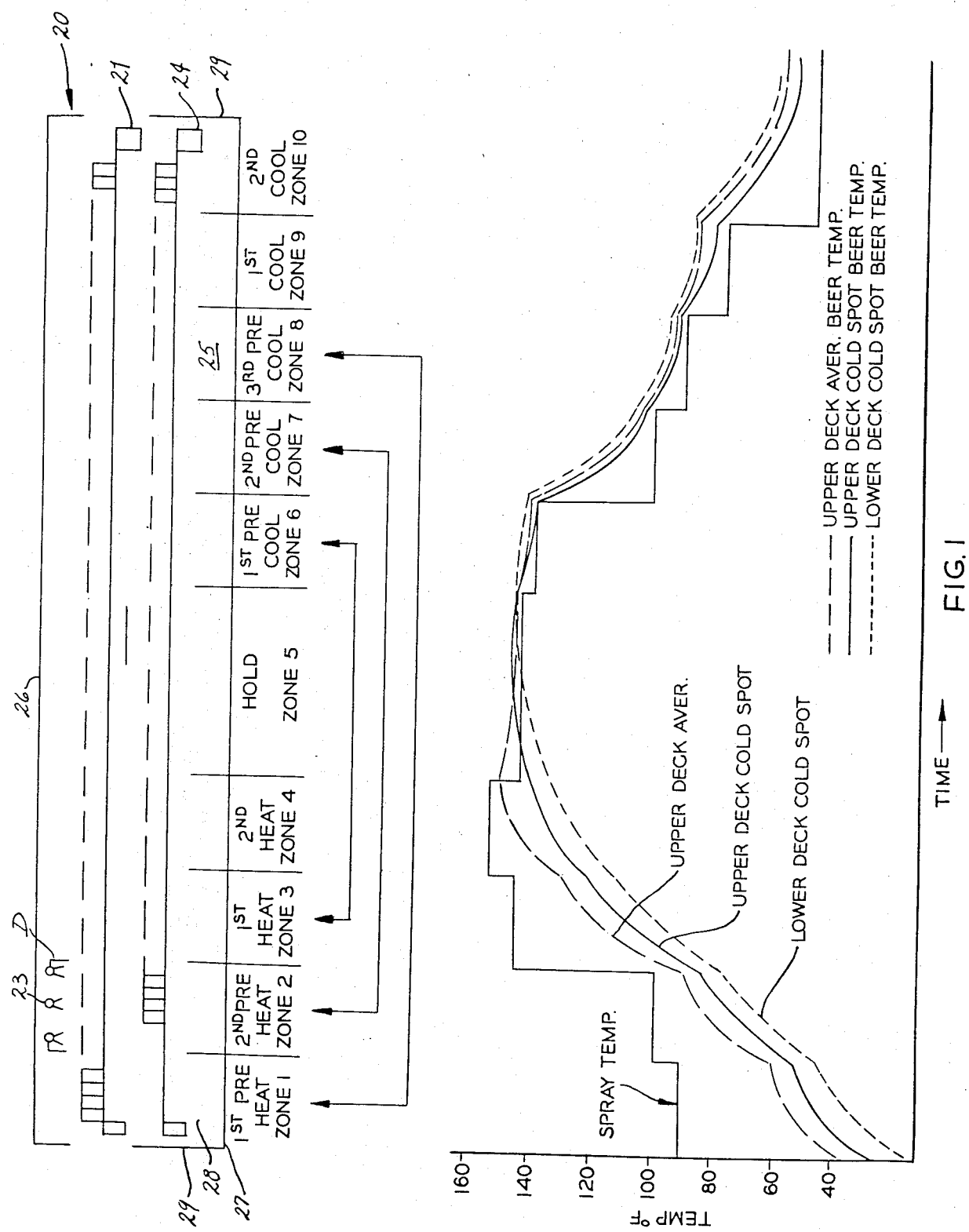
FIG. 1 is a schematic showing of a tunnel pasteurization with the spray and beer temperatures represented below the tunnel layout.

FIG. 1 shows a schematic arrangement of the pasteurizer apparatus which is typical of the type of pasteurizer construction to which this invention is directed. Directly below the pasteurizer apparatus are curves showing the spray temperature and beer temperatures on the top deck and the lower deck. The dashed line indicates the upper deck cold spot beer temperature, the solid line indicates the average beer temperature for the upper deck, and the dotted line indicates the lower deck cold spot temperature. The relationship among the upper deck and lower deck temperature, the spray temperatures and the times at each spray temperature will be discussed in greater detail hereinafter.

The mechanical details of the operation of the pasteurizer can be varied according to the type of construction favored by any particular pasteurizer manufacturer.

The pasteurizer 20 comprises a series of heating, holding and cooling zones identified by the numerals 1 through 10. There can be more than or fewer than 10 zones according to various limits of design parameters. Inside the pasteurizer 20 are top and bottom deck conveyor mechanisms 21 and 24 of any preferred conventional type, such as that known as a "walking beam", on which the unpasteurized packages 22 to be pasteurized are placed in contacting arrangement. The packages in the beer pasteurizing operation are typically filled glass bottles or metal cans. Positioned above the top surfaces of the packages a distance of about 6" to 14" is a series of spray nozzles 23 which are connected by a header and a dedicated spray pump (not shown) associated with each zone. Also for certain of the zones, dedicated external heating and/or cooling devices (not shown) are associated. In the context of this invention, the term "dedicated" means the pump is only for the headers in a particular pasteurizer zone. The illustrated pasteurizer 30 is shown as having a lower deck 24 packed with articles to be pasteurized, which deck 24 is positioned beneath the upper deck 21 and above the reservoir 25 at the bottom of each zone. This type pasteurizer is known as a tunnel pasteurizer and has an enclosed top 26, a bottom 27, side walls 28, and end walls 29 with an opening in the ends 29 through which the containers 22 pass into and out of the pasteurizing zones. Typically, the top 26 of the pasteurizer 20 is provided with suitable openings with covers to provide access to the interior of the pasteurizer 20 for maintenance, cleaning, testing of temperatures, etc.

The lower deck 24 is optional and the pasteurizer is functional with only one deck. For many pasteurizers which are currently in use and which will be rebuilt to incorporate the features of this invention, only one deck is in place, and it is not practical to add a second deck. The lower deck 24 does double capacity with little, if any, increased operating cost and only a small increase in capital cost.

Figure 3:
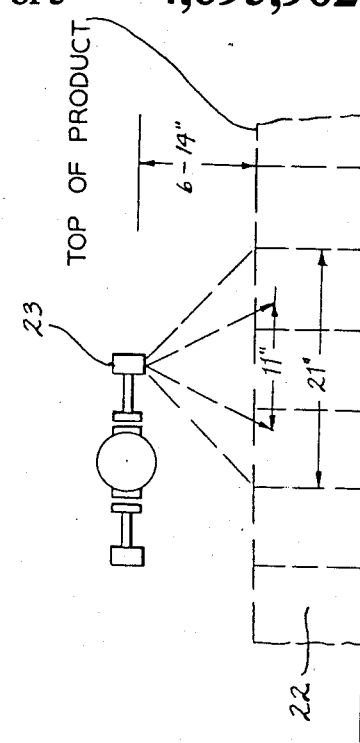
FIG. 3 is a sectional view taken along line A—A of FIG. 2.
Figure 2:
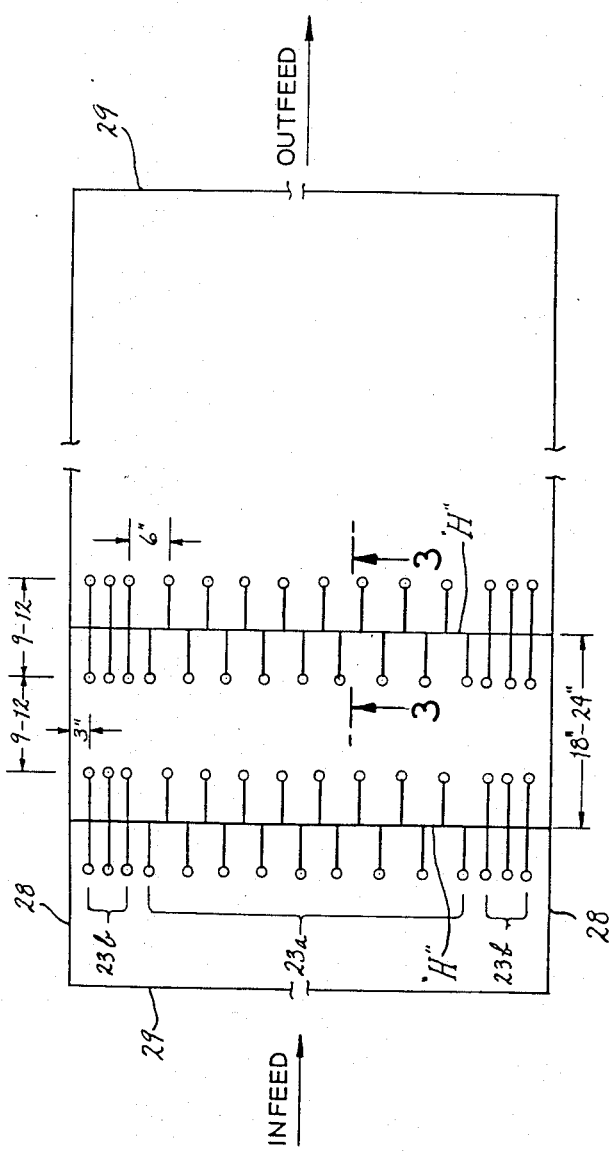
FIG. 2 is a foreshortened plan view of the top deck of a pasteurizer showing schematically the spray head arrangement.

FIG. 2 shows schematically the arrangement of the nozzles 23 in the pasteurizer 20. The nozzles 23 are positioned on headers 23a which are positioned on 18" to 24" centers running the length of the pasteurizer 20 from the infeed end to the outfeed end. As shown in FIGS. 2 and 3, the nozzles 23 extend in perpendicular arrangement from the headers "H" along the length of the pasteurizer 20. The nozzles 23 on any one header "H" are spaced 9" to 12" longitudinally. At the interior of the pasteurizer 20, the nozzles 23 are offset at 6 transverse or lateral centers along the headers "H". As noted, in the center section 23a the distance between longitudinally aligned nozzles 23 is between 9" to 12".

However at the pasteurizer sides 28, the nozzles are on 3" transverse centers and are paired opposite each other along the headers "H" for 9" or three sets of nozzles 23. These areas are indicated by the numeral 23b in FIG. 2. The remaining nozzles indicated by the numeral 23a are located at 3" intervals on alternate sides of the headers "H". Thus, the lateral spacing of the nozzles 23 at the pasteurizer sides 28 is closer, but the relative distance between nozzles 23 extending in the same longitudinal direction from the headers "H" is the same distance as the spacing of the nozzles in the center area 23a. We have found that this arrangement of nozzles 23 provides a uniform coverage of spray water to all of the packages 22 in the tunnel including those adjacent to the side walls 28, where previous pasteurizers using different nozzle arrangements and water flow often failed to reach.

FIG. 3 shows a drawing of the preferred nozzle 23 of the present invention which provides a circular hollow cone pattern and has a ⅜" orifice opening. The pressure to the nozzles 23 is about 5 to 6 psig and the spray density is above about 6 gal./min./ft.$^2$ of tunnel surface area so as to provide uniform water coverage to all of the containers. Preferably the spray density is above 7 gal./min./ft.$^2$ and at certain locations in the tunnel is as much as about 9 gal./min./ft.$^2$. Previously many spray heads were recommended for operation at a spray density of 3-4 gal./min./ft.$^2$. This caused many containers to pass through the pasteurizer with wide fluctuations in P.U. input. A typical spray pattern at the top of the containers is illustrated in FIG. 3 and the outside diameter is about 21" and the inside diameter is about 11".

The spray pattern cones are substantially (on the order of 80%) transparent. This permits the simultaneous wetting of a package by the sprays from many nozzles, without the droplets hitting each other.

At the ends of the zones identified in FIG. 1 are deflectors "D" which keep the spray waters from one zone from carrying over to the next adjacent zone. These are conventional items attached to the spray heads 23.

When spray water is applied to the top of a package, substantially all of the heat transfer is through the side walls of the container because there is a gas space immediately beneath the lid of the container which is an impediment to heat transfer. In conventional metal cans there is a hard plastic coating over the outside of the can to protect the finish during processing and this causes water to flow outside of the can in circuitous rivulets, which impairs the efficiency of heat transfer so that a larger volume of water flowing over the outside of the can will increase the effective surface area which is contacted by the water, thus increasing the efficiency of the heat transfer. A lower flow rate is permissible for bottles because the water spreads out more smoothly and uniformly over the bottle surface even though the glass has a lower overall co-efficient of heat transfer.

As hereinbefore briefly discussed, in a filled container there is what is defined as a "cold spot", which is located ¼" above the bottom of the container at the center of the container. The temperature gradient of the contents of the container grows progressively hotter as one goes from the cold spot to the top of the container. In order to insure complete pasteurization of all the contents within the package, it is necessary that the temperature of the cold spot reach 140° F. As noted it is desirable to pasteurize at the lowest possible peak cold spot temperature; therefore, it is desirable that the peak cold spot temperature be as close to 140° F. (but above it) as possible. In the present invention we have been able to reduce the maximum temperature of the cold spot to 140° F. to 143° F. and preferably at 141° F. for a 1° F. margin of safety.

At the same time, the input of pasteurization units (P.U.) to the contents of each package is between 5.6 and 20 and preferably more than 10. As previously noted there is some difference of opinion as to the minimum P.U. needed to insure adequate pasteurization, but arbitrarily we have selected a standard of at least 10 as our preferred minimum. At the same time, in order to insure the greatest uniformity of P.U. input to each of the containers in the pasteurizer it is desirable that the standard deviation of P.U. input be no greater than about 2 and preferably less. It has been found in present pasteurizers that there is a standard deviation of P.U. input on the order of 4-8 and sometimes even greater.

As hereinbefore noted, the term "standard deviation" as used in the beer industry and in this application means that all of the beer packages that go through the pasteurizer in a given run have P.U. input of ±2 P.U. units of each other.

Figure 4:
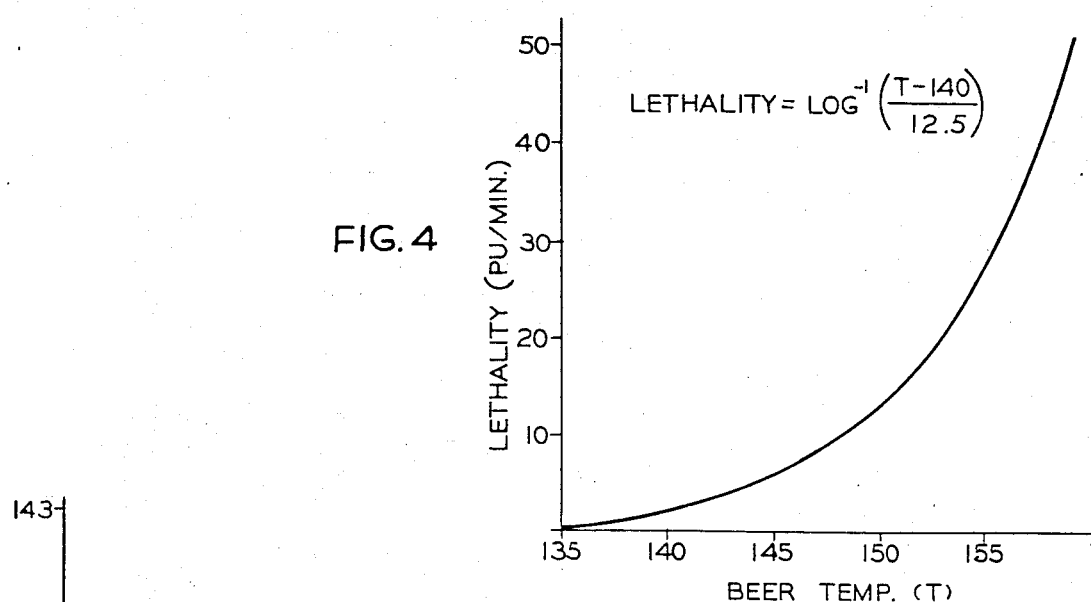
FIG. 4 is a graph of P.U. input versus beer temperature.

FIG. 4 shows a graph of lethality (P.U. input per/min.) versus beer temperature, which is a logarithmic relationship and clearly shows that while accumulation starts at 120° F., P.U. input does not become significant until the beer temperature has reached the mid to upper 130's.

Table I shows in graph form the temperature v. lethality relationship.

TABLE I

| Temp. (°F.) | Lethality (P.U./Min.) |
|---|---|
| 120 | 0.025 |
| 127.5 | 0.10 |
| 135 | 0.40 |
| 140 | 1.00 |
| 142 | 1.45 |
| 145 | 2.51 |
| 147 | 3.61 |
| 150 | 6.31 |
| 152.5 | 10.00 |
| 155 | 15.85 |
| 160 | 39.81 |

The longer holding time and the greater and more uniform spray wter flows allows the P.U. input to a lower deck to nearly equal the P.U. input to the upper deck without overheating the upper deck because of the length of the second heating and holding zones. The function of the second heating zone is to bring the cold spot temperature to 140° F. to 141° F. without using the extremely hot spray water temperatures, i.e., not above about 150° F. It is important that the spray water temperature to the second heating zone and the holding zone be controlled carefully to predetermined levels to keep the hot spot temperature of the package on the upper deck (or the single deck as the case may be) as low as possible to hold down internal container pressure. The maximum hot spot temperature closely approximates the spray temperature of the zone.

The length of the second heating zone is determined such that the ratio of the initial to final temperature differences or thermal driving forces is equal to approximately 4.8-5.0. For purposes of this application these driving forces are defined as the differences between the spray temperature in the zone and the average product temperature on entering and on leaving the zone. Using this principal the difference in cold spot temperature at the upper and lower deck at the exit of the second heating zone will be less than 1° F. The cold spot temperature is approximately 141° F. on the upper deck or on the single deck of a one deck pasteurizer. Since the first and second heating zones are calculated to contribute only about 3 P.U., the majority of the P.U. input occurs in the holding zone, where the cold spot temperatures of both decks are practically equal on entering the zone and are equal on leaving the zone.

Therefore, if this ratio is high (about 5), a variation in product entering temperatures can be tolerated as the exit temperature difference is reduced to one-fifth of the initial difference. Standardizing holding zone intemperature avoids significant variation in P.U. input to the packages because most P.U. input is in the holding zone.

The mentioned high value of the ratio of the initial to the final temperature differences in the second heating zone and the resulting length of the second heating zone is a key factor in achieving uniformity in P.U. input to the packages on a single deck pasteurizer.

In a double deck machine this is a critical factor is maintaining product temperatures on both decks within one degree of each other on entering the holding zone which results in only small P.U. input differences between packages on the upper and lower decks on leaving the holding zone.

Another significant factor is the longer holding zone which permits the spray temperature of the lower deck to come to equilibrium with the spray temperature of the top deck at a level close to the desired product temperature and where the P.U. input rate is high.

Another key factor is the regenerative effect of the first precool (zone 6) and the first heat zone (zone 3) in a double deck machine (See FIG. 1).

We purposely keep the spray temperatures of the first precool zone high (approximately 135° F.) to take advantage of the increase in temperature of the spray as it passes over the upper deck to increase P.U. input to the lower deck and thus minimize the total P.U. difference between decks.

This P.U. difference is caused by the lower deck spray temperature being less than the upper deck spray temperature entering the holding zone (zone 5). Accumulated P.U. is therefore less on the lower deck at this point. However, the packages on the lower deck pick up a significant part of the P.U. difference as they pass through the first precool zone (zone 6) due to the increased spray water temperature effect previously described for the first precool zone.

Another advantage of the high ratio value between initial and final temperature differences in the second heating zone is that the hot spot temperature is reduced from about 148° F. to 154° F. (or more) to about 145° F. or less. This is important because the internal pressure of the package is dependent on the hot spot temperature. With continued trends toward "light weighting" or thinner walled containers, reduced internal pressure becomes an important factor in container design.

Figure 5:
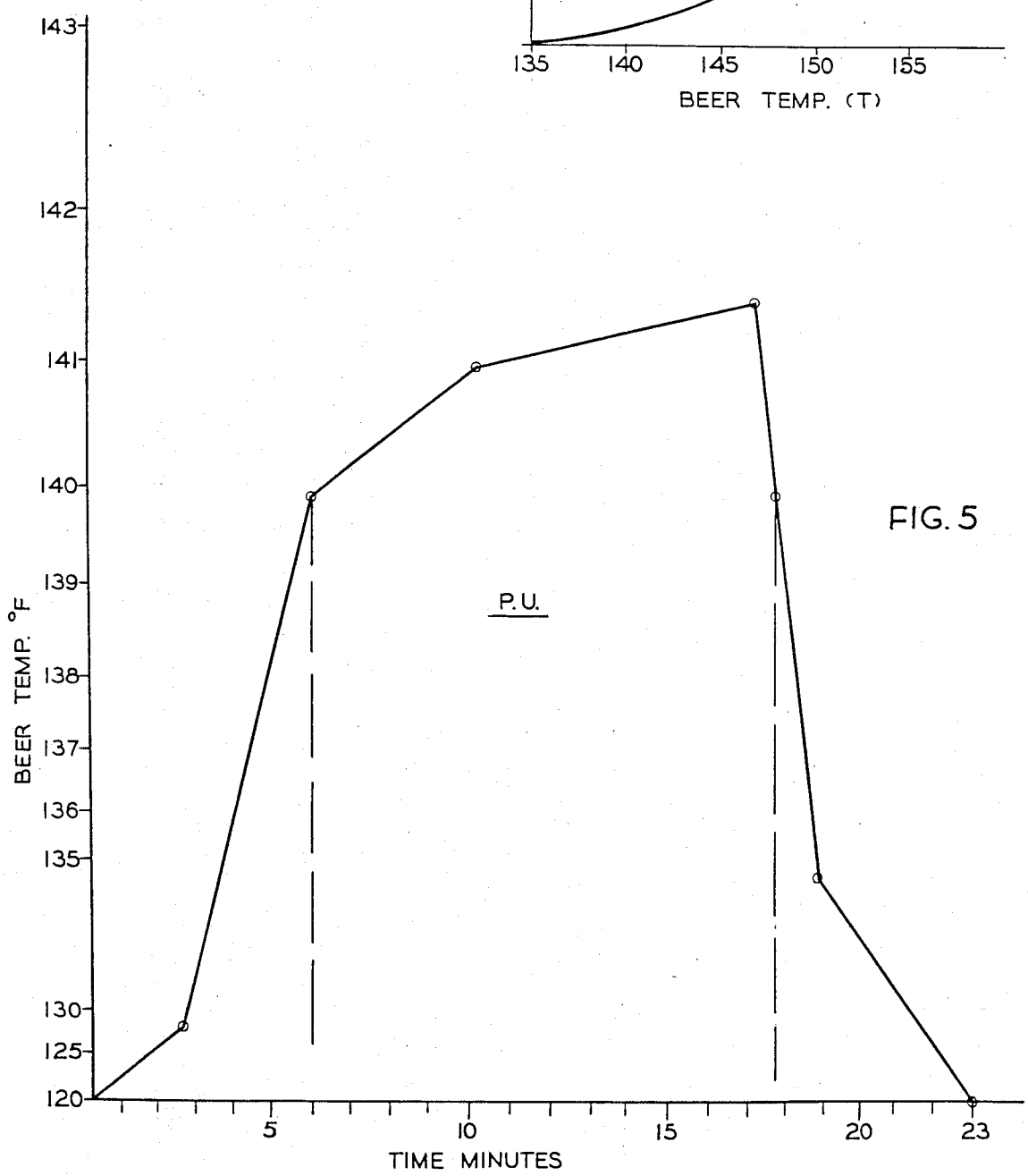
FIG. 5 is a graph showing total P.U. input.

FIG. 5 shows that a typical curve of beer temperature versus time in a pasteurizer in which the total P.U. input will fall between 10 and 17 P.U. The P.U. is the area beneath the curve and it is clear that the majority of accumulated P.U. is added when the beer temperature is above 140° F. as shown by the area between the broken lines.

Figure 6:
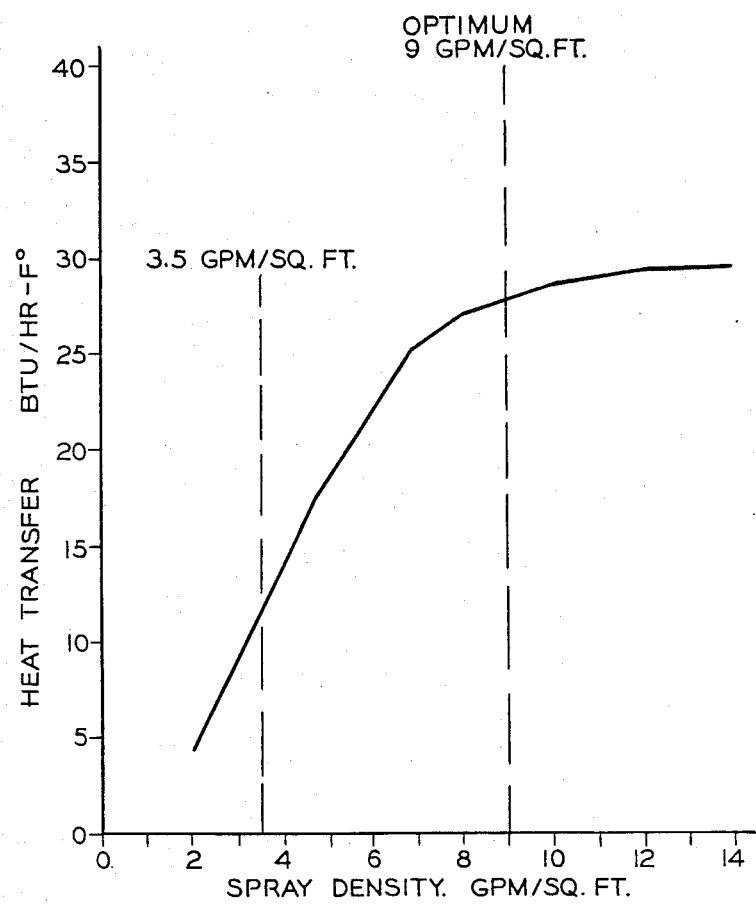
FIG. 6 is a graph of heat transfer versus spray density.

FIG. 6 is a graph showing the relationship between spray density and heat transfer in BTU/hr. per F°, which indicates that the optimum spray density is about 9 gal./min./ft.$^2$ and that further increases in spray density do not significantly increase the heat transfer rate and consequently do not significantly increase the P.U. input.

Figure 7:
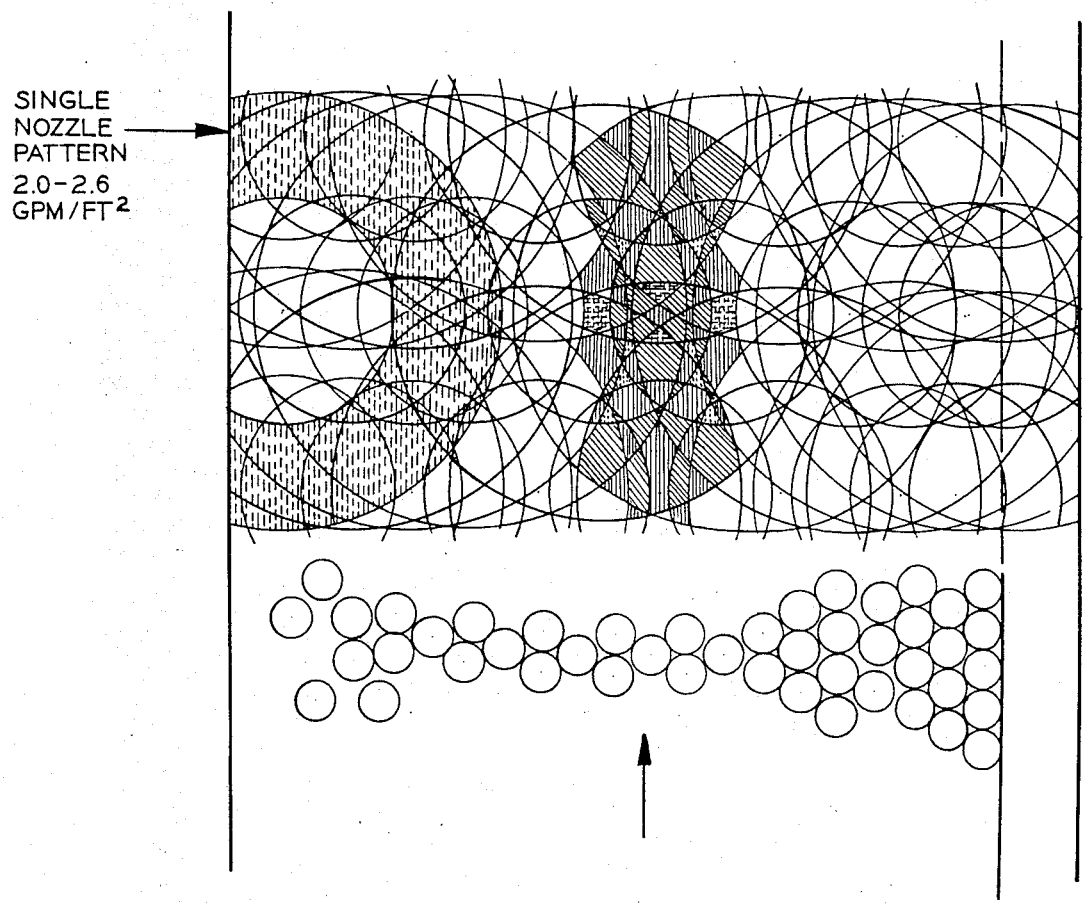
FIG. 7 is a fragmentary line drawing showing water distribution with a spray density of 9 gal./min./ft.$^2$ with the spray head distribution of FIG. 2.

FIG. 7 shows a spray pattern diagram at spray pressure of 5–6 psig and 9–11.7 GPM/ft.$^2$ spray density. The overlapping of the spray patterns onto the package is shown by the shaded and hatched areas which indicate the spry densities at specific locations on the deck.

Referring back to FIG. 1, the preferred regenerative typing of the 10 zones is shown schematically. The generation is between zones 3 and 6, 2 and 7 and 1 and 8. In other words, the reservoir at precool zone 6 is used to heat the spray to the first heating zone 3. This effect has already been considered in detail previously in connection with the discussion of equalization of P.U. input in a double deck pasteurizer. Similarly, the heat transfer to the cooling water in precool zones 8 and 7 from the hot containers is transferred to preheating zones 1 and 2 respectively so as to reduce energy requirements. Arbitrarily, preheat is defined as a zone where spray water temperature is below about 140° F., and a heating zone has spray water temperature above about 140° F.

Following in Table II is a summary of the important variables in a preferred tunnel pasteurizer.

The key items of zone spray density, spray temperature and average produce temperature is for all packages.

TABLE II

| Zone # | Zone name | Time (Minutes) | Spray density GPM/ft. | Spray Temp., °F. | Av. prod. BOT, °F. | Longitudinal Nozzle row spacing |
|---|---|---|---|---|---|---|
| 1 | Preheat 1 | * | 9 | 73°–90 | | 9" |
| 2 | Preheat 2 | * | 9 | 95°–115 | | 9" |
| 3 | Heating 1 | * | 9 | 138°–143° | | 9" |
| 4 | Heating 2 | * | 9 | 143°–148° | 141° | 9" |
| 5 | Holding | 7–8 | 7 | 141° | 141° | 12" |
| 6 | 1st Precool | * | 9 | 135°–138° | | 9" |
| 7 | 2nd Precool | * | 9 | 92°–113° | | 9" |
| 8 | 3rd Precool | * | 9 | 70°–87° | 85°–95° | 9" |
| 9 | 1st Cool | * | 9 | 65°–80° | | 9" |
| 10 | 2nd Cool | * | 9 | 62°–77° | 70°–85° | 9" |

*The time in each zone, except the holding zone, is greater than 2¼ minutes for cans and 4¼ minutes for bottles.

The foregoing Table II refers to the sketch and graph of FIG. 1. External heaters are provided for zones 4–8 while the cooling water at zones 9 and 10 is 50° F. from an external chilled water system.

The foregoing described process and apparatus has been described specifically with respect to beer, but the process, concept, and apparatus are applicable to all products for which tunnel pasteurization is applicable.

This application is intended to cover all variations of the disclosure which fall within the spirit and scope of the invention and is limited only by the claims which follow.

What is claimed is:

1. An improved method for tunnel pasteurization of beer in packages wherein water spray is applied at a rate of more than about 6 gal./min./ft.$^2$ to the tops of the packages of beer from spray nozzles staggered transversely across the width of the tunnel and positioned above the packages to control P.U. input and wherein the P.U. input to each beer package is at a predetermined level between about 5.6 to about 20 comprising,
   (a) controlling P.U. input to all packages of beer at a standard deviation of less than about 2 P.U. for each package while providing the P.U. input to each package at a predetermined minimum level above about 5.6,
   (b) maintaining cold spot beer temperature in any package between about 140° F. and about 143° F., and
   (c) maintaining beer out temperature between about 70° F. and about 85° F.

2. The method of claim 1 wherein the beer out temperature is maintained within ±1° F. of a predetermined beer out temperature.

3. The method of claim 1 wherein the spray density is about 7 gal./min./ft.$^2$.

4. The method of claim 1 wherein the spray density is about 7 to about 9 gal./min./ft.$^2$.

5. The method of claim 1 wherein the P.U. to all packages is about 10.

6. An improved method for tunnel pasteurization of drink product in packages wherein water spray is applied to the tops of the packages from spray nozzles which are staggered transversely across the width of the tunnel and positioned above the packages; to control P.U. input and wherein the P.U. input to each package is at a predetermined P.U. input level in a predetermined P.U. range comprising,
   (a) moving drink product filled packages through a pasteurizer tunnel having a bed divided into zones for heating and cooling the packages,
   (b) controlling the P.U. input to all packages of drink product at a standard deviation of less than about ±2 P.U. for each package while providing P.U. input to each package above a predetermined minimum level by maintaining in each such zone a substantially uniform spray density of at least 6 gal./min./ft.$^2$ along and across the bed in said zone,
   (c) limiting peak cold spot drink product temperature in any package between a minimum pasteurization temperature and a predetermined maximum temperature, and
   (d) maintaining drink product out temperature in any package at a predetermined level.

7. An improved method for tunnel pasteurization of beer in packages at P.U. ranges of from about 5.6 to about 20 comprising,
   (a) moving beer filled packages through a pasteurizer tunnel divided into preheat, heating, holding, and cooling zones from entrance to exit,
   (b) applying spray water to the packages from above by spray nozzles which are staggered transversely to heat and cool the same,
   (c) maintaining a spray density of at least 6 gal./min./ft.$^2$, and
   (d) maintaining peak cold spot beer temperature in any beer package between 140° F. and about 143° F.

8. The method of claim 7 wherein P.U. deviation is less than about 2 P.U.

9. The method of claim 7 wherein the beer out temperature is maintained at within ±1° F. of a predetermined beer out temperature between about 140° F. and about 143° F.

10. The method of claim 7 wherein the spray density is about 7 gal./min./ft.$^2$.

11. The method of claim 7 wherein the spray density is about 9 gal./min./ft.$^2$.

12. The method of claim 7 wherein the P.U. to all packages is about 10.

13. The method of tunnel pasteurizing a drink product which is contained in a plurality of packages while imparting substantially the same P.U. input, which is in a selected range thereof, to the drink product in each of the packages, while limiting the variation of P.U. input to the packages across the width of the tunnel, the drink product accumulating a slower rate of P.U. input at a temperature t and accumulating P.U. at a substantially faster rate only upon reaching a predetermined temperature T which is greater than t, which comprises the steps of:
   i. heating the packages in a series of discrete, water spray zones of progressively increasing spray water temperature, each zone having transversely staggered spray nozzles providing a substantially uniform spray density of greater than about 6 gal./min./ft.$^2$ across the width of the tunnel and each zone having a temperature greater than t and culminating in a zone whose water spray temperature exceeds said temperature T rapidly to attain a cold spot temperature in all of the packages which is close to said temperature T while accumulating some of the P.U. input to the drink product, the residence time in said culminating zone being such that the ratio of an initial temperature difference between the cold spot temperatures of the packages upon entering said culminating zone and the water spray temperature of such zone and a final temperature difference between the cold spot temperatures of the drink product leaving said culminating zone and the water spray temperature of such zone is about 5 so as to minimize variation in cold spot temperatures of the packages when leaving said culminating zone; then
   ii. imparting a substantial part of the P.U. input to the drink product by immediately subjecting the packages to an additional zone of temperature about that of the culminating zone of step i., the residence time of the packages in said additional zone being selected so that the cold spot temperatures of the packages are substantially equal as the packages leave said additional zone; and then
   iii immediately subjecting the packages to a zone of water spray in which the temperature thereof is less than said temperature T but greater than said temperature t for a time sufficient to accumulate the remaining amount of the P.U. input to be imparted to the drink product; and then
   iv. subjecting the packages to further cooling below said temperature t to terminate P.U. input to the drink product;
   v. the cold spot temperature of the drink product in the packages being maintained between a predetermined minimum pasteurization temperature and a predetermined maximum temperature.

14. The method as defined in claim 13 wherein the product is beer, the temperature t is about 120° F. and the temperature T is about 140° F.

15. The method as defined in claim 14 wherein the P.U. input to the beer is within the range of about 5.6 to about 20.

16. The method as defined in claim 13 wherein the first heating zone of step i., whose water spray temperature is greater than t but less than T, and the cooling zone of step iii. form a regenerative pair.

* * * * *